Patented Aug. 8, 1950

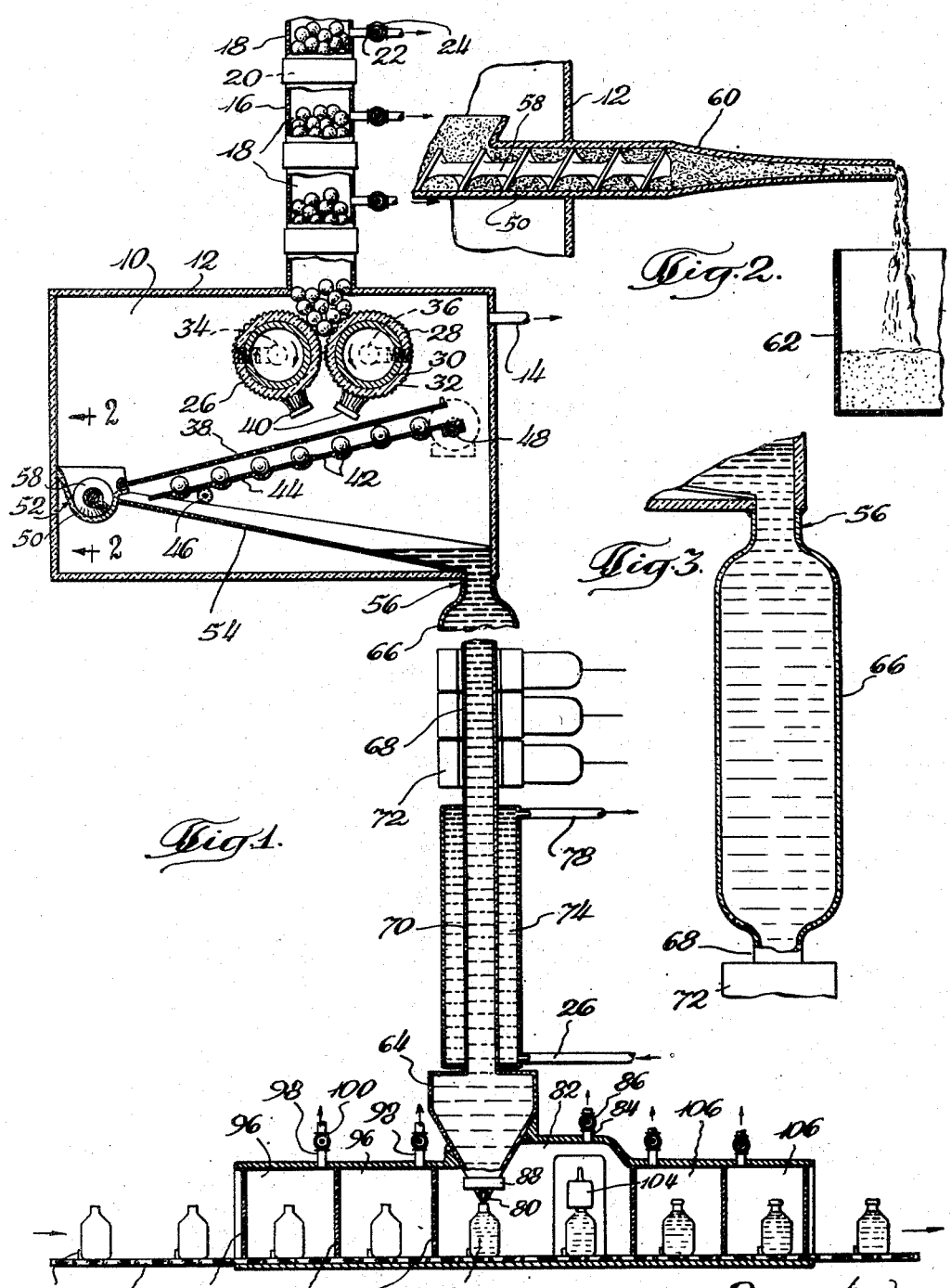

2,517,569

UNITED STATES PATENT OFFICE 2,517,569

PROCESS OF EXTRACTING AND PRESERVING THE ORIGINAL FLAVORS AND FOOD VALUE OF FRUIT JUICES

Erich Gustav Huzenlaub, Brentford, England

Application November 23, 1945, Serial No. 630,531

8 Claims. (Cl. 99—155)

My invention relates to a process of extracting and preserving the original flavors and food value of fruit juices.

Fruit juices, and particularly orange juice, are in great public demand largely because of their health giving properties. Oranges are bulky, heavy, and perishable, and the orange groves are remote from most of the large centers of population. Transportation of oranges is expensive and extraction of the juice in homes and restaurants is a tedious and time-consuming chore. The juice extractable from an orange constitutes only a part of its total bulk and weight and the numerous advantages of extracting and canning the juice at or near the orange groves has long been recognized. Many attempts have been made to develop a satisfactory process for extracting and preserving orange juice, and canned orange juice is now on the market, but its taste is so different from fresh orange juice that the canned juice is not acceptable to a large part of the public despite lower cost and greater convenience.

An object of my invention is to provide a new and improved process for extracting and preserving the original flavors and food value of orange juice and the juices of other fruits and vegetables.

Another object of my invention is to provide a new and improved process for extracting and preserving fruit and vegetable juices which is economical and can be carried out by persons of ordinary skill in the field of food processing.

Another object of my invention is to provide new and improved apparatus for performing the process.

Other objects and advantages will become apparent as the description proceeds.

In the drawings, Fig. 1 is a diagrammatic representation of a preferred form of apparatus for carrying out my new and improved process; and Fig. 2 is a sectional view taken on the line 2—2 of Fig. 1 and showing a detail of the screw conveyor and sealing means for disposing of the pulp or other waste product.

Fig. 3 is a detail view in cross section of the upper portion of the discharge pipe from the juice-extracting compartment shown in Fig. 1.

In Fig. 1, I have illustrated a compartment 10 in which the extraction of the juice is effected, this compartment having walls 12 of glass, plastic, or other suitable non-oxidizing material. The compartment 10 is connected by a pipe 14 with a source of vacuum whereby a high vacuum such as 27½ inches of mercury or more is maintained in the extracting compartment 10 during operation of the apparatus. It will be understood that the walls 12 are properly constructed and supported to withstand the differential pressure resulting from the vacuum maintained in the compartment.

The oranges are fed into the extracting compartment 10 through a pipe or duct 16 provided with one or more vacuum locks of any known or suitable construction. Such vacuum locks are shown as comprising a plurality of chambers 18 separated by doors 20. Each chamber is provided with one or more pipes 22 and valves 24 whereby air can be independently admitted or exhausted from each chamber as is well understood in the art. Oranges discharged from the lowermost chamber 18 enter the extracting compartment 10 and fall upon the extracting rollers 26 and 28, each of which has a hollow metal core 30 surrounded by a corrugated sleeve 32 of enamel, glass, plastic, or other non-oxidizing material.

The rollers 26 and 28 are driven by shafts 34 and 36 respectively, and these shafts may have a center core of metal surrounded by non-oxidizing material and are preferably mounted so that the corrugated rollers may be moved toward and from each other to provide a fine adjustment therebetween. It is to be understood that the rollers and shafts need not have a metal core but may be made completely of non-oxidizing material, it being essential only that no part of the rollers or shafts exposed to contact with the fruit or juice thereof be formed of metal or other oxidizing material. Suitable packing is provided at the points where the shafts project through the walls 12 of the compartment 10 to prevent leakage of air into the compartment around these shafts.

The rollers 26 and 28 are preferably adjusted so that as these rollers turn in opposite directions as indicated by the arrows in Fig. 1, the ridges of the two rollers come opposite each other and cut the skin and pulp of the oranges into elongated strips as the oranges pass therethrough. The squeezing of the oranges between the rollers and the cutting action of these rollers extracts the juice from the oranges and this juice, and the skin, pulp and seeds, fall on an inclined screen 38. The recessed portions of the rollers 26 and 28 also come opposite each other as the rollers turn and the depth of the recess in each roller is preferably approximately equal to the thickness of the orange skin, including the pulp layer attached thereto, so that the distance from the bottom of the recess of one roller to the bottom of the recess of the opposite roller is approximately equal to the double thickness of the orange skin passing therebetween. Stationary brushes 40 are preferably provided to remove all skin and pulp from the rollers 26 and 28.

The screen 38 is provided with openings which permit only the juice to pass therethrough. The lower side of the screen 38 is subjected to a gentle bombardment by balls 42 mounted in recesses provided in a reciprocating frame 44. The frame is supported at one end by a rod 46, and the other end of this frame is supported and reciprocated by a crank 48. The bombardment of the screen 38 prevents clogging of the screen so that the orange juice can pass therethrough, and causes the skin, pulp, seeds and other waste matter to slide down the screen into the housing 50 of a screw conveyor 52. The juice passing through the screen 38 flows into an inclined trough 54 leading to discharge pipe 56 communicating with the compartment 10 at a lower portion thereof.

The screw conveyor 52 is of the pressure- and seal-forming type and includes a rotating screw 58 which forces the skin, pulp, seeds, and any other refuse material into a contracting tube 60 which extends through a wall of the extracting compartment and has its discharge end located above a receptacle 62 or other means into which the waste material is discharged. It will be understood by those skilled in the art that the screw conveyor packs the waste material into the tapered tube with sufficient firmness to form a vacuum seal so that air cannot enter the extracting compartment through this tube. While I have referred to the orange skins, pulp, and seeds as waste material, this material has value as an ingredient of animal feed and constitutes a by-product of my process.

The screen 38, balls 42, frame 44, rod 46, crank 48, housing 50, trough 54, and screw 58, as well as all other parts of the apparatus with which the orange juice comes in contact or can come in contact, are partly or wholly formed of non-oxidizing material and present only a non-oxidizing surface so that at no time in the operation of my process does the orange juice come in contact with any metal or other oxidizing material. The pipe 56 and tank 64 into which it discharges are likewise formed wholly of or are lined with non-oxidizing material. For convenience this pipe 56 will be considered as consisting of an upper and enlarged portion 66, an intermediate portion 68, and a lower portion 70, all of which are normally filled with orange juice during the operation of the apparatus.

The oranges should be washed before depositing them in the duct 18 leading to the extraction compartment 10, and the oranges should be inspected also, and all spoiled or rotten oranges removed. However, some dirt and spoiled oranges will find their way into the extracting compartment 10, and it is usually necessary and desirable therefore to sterilize the orange juice before bottling it. This sterilization could be accomplished in various ways, but is most effectively done by means of frequencies within the infrared range. A preferred method of application is by means of the magnatype lamps 72 arranged one above the other and surrounding the intermediate portion 68 of the pipe 56. The orange juice in this intermediate portion of the pipe is preferably heated to between 225° to 230° F. for a period of ten minutes or more.

Any vapor resulting from such heating tends to be absorbed by the orange juice in the upper portion of the pipe 56 and in the compartment 10, and it is desirable to prevent the temperature of the juice in the upper portion to rise above the corresponding boiling point of the vacuum employed. Upper portion 66 of the pipe is therefore made of sufficient volume so that any vapor produced in the central portion 68 will be cooled and converted to liquid before reaching the upper end of the pipe 56. The lower portion 70 is provided with a cooling jacket 74 of any suitable type but illustrated as having a water inlet 76 and a water outlet 78 and effective to cool the orange juice before it enters the tank 64. As an example of the proper length and size of the several portions of the pipe 56, upper portion 66 could be sixteen feet, the intermediate or heating portion 68 ten feet, and the cooling portion 70 ten feet, but it is to be understood that these figures are illustrative only and that other lengths could be utilized. It is important, however, that the upper portion 66 have a capacity of six to eight or more times that of heating portion 68 and be of sufficient length so that no vapor reaches the compartment 10.

The tank 64 has an outlet 80 located in a filling and capping compartment 82 which is connected with a source of vacuum by way of pipe 84 and valve 86. Suitable valve mechanism 88 controls the discharge of the orange juice into glass bottles 90 or other suitable containers which are moved to a position beneath the outlet 80 by a conveyor 92 having upwardly extending ribs 94 against which the bottles rest. These ribs serve properly to space the bottles lengthwise of the conveyor for movement through the compartment 82 and vacuum locks on each side thereof.

Before entering the filling compartment 82 each bottle must pass through a plurality of vacuum locks 96 illustrated as consisting of two chambers, each provided with a pipe 98 and valve 100 whereby the pressure in a chamber can be individually controlled. Doors 102 separate the vacuum chambers from each other and also from filling compartment 82 and from atmosphere. After a bottle has been filled, a capping mechanism 104 of any usual construction applies a crown seal or other closure thereto. The capping mechanism is located in the evacuated filling compartment 82 and it will be understood that all of the walls of this compartment as well as all exposed parts of the valve mechanism 88 and capping mechanism 104 are of non-oxidizing material. The filled and capped bottles leave the filling compartment by way of a second set of vacuum locks 106. The number of vacuum locks may be varied as desired and instead of sealing the orange juice in bottles, the orange juice may be put up in metal cans or any other suitable containers provided that the metal inner surface of the cans or other containers are coated with material which is non-oxidizing and which does not react with any ingredient of the orange juice.

In carrying out my novel process, the oranges are preferably first washed and inspected, and all rotten oranges removed before the remaining oranges are put into the upper end of the duct 18 or any suitable hopper which may be connected therewith. The uppermost chamber 18 of the vacuum locks is then exposed to atmosphere and thereafter the door which separates this chamber from the hopper is opened to permit the oranges to fall into the chamber. This chamber is then evacuated and the door 20 which separates this chamber from the next chamber therebelow is opened to permit the oranges to fall into the lower chamber. The door 20 is then closed and, after a short interval, for further evacuation of air the door which separates this chamber from the chamber therebelow is opened and the oranges dropped into the latter chamber. This step by step movement of the oranges through the vacuum chambers is continued until the oranges are discharged onto the rollers 26 and 28 in the extracting compartment 10.

Rotation of these rollers squeezes the oranges therebetween and cuts the skin and pulp into strips.

During this operation the juice is extracted from the oranges and a certain amount of oil is extracted from the orange skins. The oil extracted from the orange skins mixes with the juice but is insufficient in amount to alter the flavor of the juice. In fact, the presence of a small amount of this oil in the juice appears to be beneficial in preserving the original flavor and food value of the juice. The mixture of oil and orange juice is hereinafter referred to merely as orange juice.

The juice, pulp, skin and seeds fall on inclined screen 38, and the brushes 40 prevent any of this material from adhering to the extracting rollers. Bombardment of the screen 38 by the rubber balls 42 prevents clogging of the screen and facilitates the passage therethrough of the orange juice. The waste material, that is, the skin, pulp, and seeds, travels down the screen into the conveyor 52. The conveyor screw forces the waste material into the tapered tube 60 and because the skin and pulp have been cut into strips, the conveyor screw can and does pack the waste material into the tapered tube 60 tightly enough to provide an effective air seal which prevents the entry of air into the extracting compartment 10. The waste material is discharged into the container 62 or onto a travelling conveyor as may be desired.

While the vacuum locks through which the oranges enter the extracting compartment 10 prevent any appreciable amount of air from entering this compartment with the oranges, the oranges themselves contain air and I have provided means for removing all of this air from the orange juice. As the orange juice is extracted by the rollers 26 and 28 and passes through the screen 38, it is exposed to the vacuum in the compartment 10 and during this time air entrained in the juice has an opportunity to escape therefrom. To insure complete elimination of air, however, the juice is also exposed to the high vacuum while it remains in the compartment 10 and under conditions favorable to the removal of air from the juice, i. e. with a large exposed surface. The rate of operation of the apparatus is such that a period of at least one minute ensues between the time the orange juice is extracted by the extracting rollers and the time that this juice enters the upper end of the pipe 56, and during this entire time the conditions are such that any air entrained in the juice can escape therefrom and be drawn off by the vacuum producing means. While the shape and arrangement of the extracting compartment and the mechanism therein can be varied within wide limits, and other separating means such as a centrifuge can be used in lieu of the screen 38, I have found it desirable to expose the orange juice to a high vacuum for at least one minute under conditions which will facilitate the removal of air from the juice before the juice is bottled or sealed in other types of containers.

As the juice slowly feeds downwardly in this pipe 56, it is first exposed to vapors driven off from juice therebelow by the heating means 72.

The upper section 66 of the pipe is made of sufficient length and cross section, however, so that all vapors are condensed in this upper section without overheating the orange juice therein, and none of these vapors reach the extracting compartment 10. When the orange juice reaches the pipe section 68, it is exposed to the action of the heating means 72. These means heat and sterilize the juice and possibly have other advantageous actions thereon. The juice is then cooled in the lower section of the pipe 70 surrounded by the water jacket 74 and thereafter passes into the tank 64. From the tank 64 the juice is discharged into glass bottles or other containers having non-oxidizing inner surfaces and sealed therein under high vacuum.

The bottles are evacuated before entering the filling compartment and are sealed before leaving this compartment. Throughout the entire process the juice is protected against contact with air, metal, and other oxidizing material, so that not even as much as a screw head of oxidizing material is exposed to the orange juice. This protection of the orange juice against air and oxidizing material and the blending of juice with the proper amount of oil from the skin produces a juice which retains all its natural flavors and nutritional characteristics.

While I have described my invention as being used to extract and preserve orange juice, my invention is not limited to such use but is capable of general application to the extraction and preservation of fruit and vegetable juices. Likewise I have illustrated only a single embodiment of my novel apparatus and it is to be understood that this apparatus may be widely varied to satisfy different conditions of operation both in the extraction and preservation of orange juice and in the extraction and preservation of the juices of other fruits and vegetables. My invention includes all variations, modifications, and alternatives coming within the scope of the appended claims.

I claim:

1. The method of extracting fruit and vegetable juices and preserving the original flavors and food values thereof which comprises, cutting the foodstuff into strips under a high vacuum, squeezing the juice from the pulp without substantially disintegrating the pulp and skins, separating the juice from the waste skin strips, pulp and any seeds, discharging said waste, the skin strips serving as packing means during the discharging step to prevent lessening of the vacuum, and the vacuum serving to extract air dispersed in the juice and to prevent air from later coming in contact therewith, forming, under the same high vacuum, a moving column of said juice, said column comprising at a given moment an upper portion, an intermediate portion and a lower portion, the upper portion comprising a volume at least about six times the volume of the intermediate portion, heating said intermediate portion of juice to sterilize the same, permitting any vapor formed during the heating step to condense in the juice comprising said upper portion, introducing sterilized and cooled juice from the lower portion of the column into a container and sealing the juice therein, permitting heated juice in the intermediate portion to form a succeeding lower portion and cooling the same, replacing the theretofore intermediate portion of juice by juice from the upper portion, replenishing the upper portion with new juice, and repeating the foregoing steps,—protecting the juice against contact with air and oxidizing material at all times from the beginning of the extracting operation until the sealed containers are opened.

2. The method as defined in claim 1, wherein the respective lengths of the several portions of the column of juice are: Upper portion, about sixteen feet; intermediate portion, about ten feet; and lower portion, about ten feet.

3. The method as defined in claim 1, wherein the intermediate portion of the column of juice is heated to a temperature between about 225° and about 230° F. for at least ten minutes by radiant energy within the infrared range.

4. The method as defined in claim 1, wherein the volume of the upper portion of the column of juice is from about six times to about eight times the volume of the intermediate portion thereof.

5. The method of extracting orange juice and preserving the original flavor and food value thereof which comprises cutting oranges into strips under a high vacuum, squeezing the juice from the pulp and some oil from the skins without substantially disintegrating the pulp and skins, mixing the oil and juice, separating the mixed orange juice from the waste skin strips, pulp and any seeds, discharging said waste, the skin strips serving as packing means during the discharging step to prevent lessening of the vacuum, and the vacuum serving to extract air dispersed in the orange juice and to prevent air from later coming in contact therewith, forming, under the same high vacuum, a moving column of the orange juice, said column comprising at a given moment an upper portion, an intermediate portion and a lower portion, the upper portion comprising a volume at least about six times the volume of the intermediate portion, heating said intermediate portion of orange juice to sterilize the same, permitting any vapor formed during the heating step to condense in the juice comprising said upper portion, introducing sterilized and cooled orange juice from the lower portion of the column into a container and sealing the juice therein, permitting heated juice in the intermediate portion to form a succeeding lower portion and cooling the same, replacing the theretofore intermediate portion of juice by juice from the upper portion, replenishing the upper portion with new juice, and repeating the foregoing steps,—protecting the orange juice against contact with air and oxidizing material at all times from the beginning of the extracting operation until the sealed containers are opened.

6. The method as defined in claim 5, wherein the respective lengths of the several portions of the column of orange juice are: Upper portion, about sixteen feet; intermediate portion, about ten feet; and lower portion, about ten feet.

7. The method as defined in claim 5, wherein the volume of the upper portion of the column of orange juice is from about six times to about eight times the volume of the intermediate portion thereof.

8. The method as defined in claim 5, wherein the intermediate portion of the column of orange juice is heated to a temperature between about 225° and about 230° F. for at least ten minutes by radiant energy within the infrared range.

ERICH GUSTAV HUZENLAUB.

REFERENCES CITED

The following references are of record in the file of this patent:

UNITED STATES PATENTS

| Number | Name | Date |
| --- | --- | --- |
| 1,182,213 | Ryan | May 9, 1916 |
| 1,189,127 | Kellogg | June 27, 1916 |
| 1,686,096 | Manning | Oct. 2, 1928 |
| 1,715,932 | Kokatnur | June 4, 1929 |
| 1,925,196 | Maull | Sept. 5, 1933 |
| 2,049,789 | Grindrod | Nov. 3, 1936 |